Dec. 27, 1966 H. ZIEGLER 3,293,911
CURRENT-VARIATION TRANSDUCER FOR MEASUREMENT
OF FORCE AND THE LIKE
Filed June 30, 1964
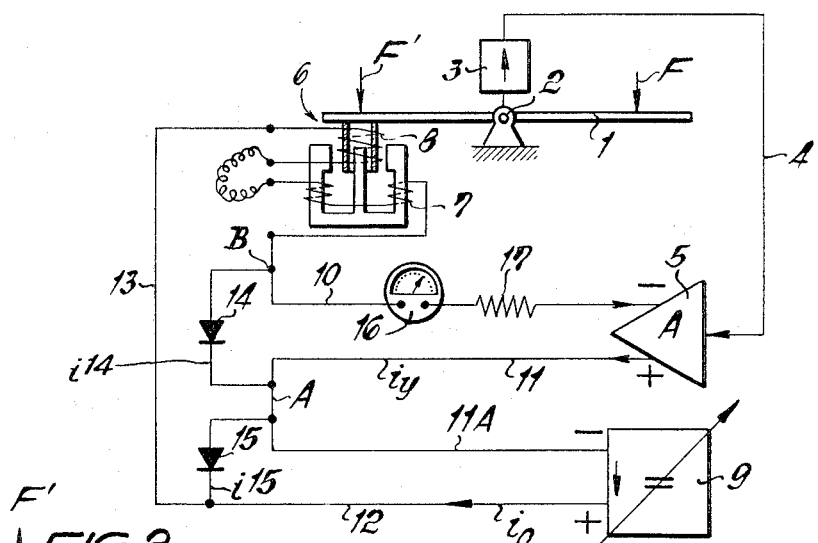
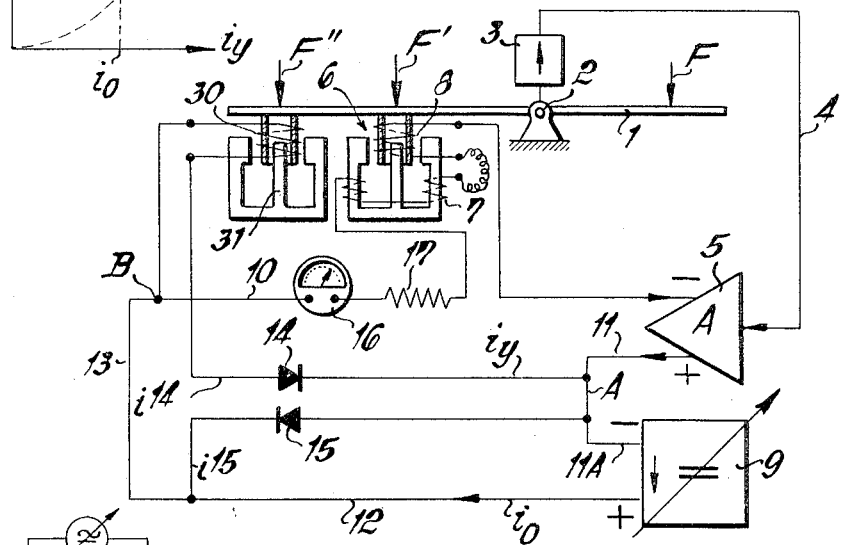
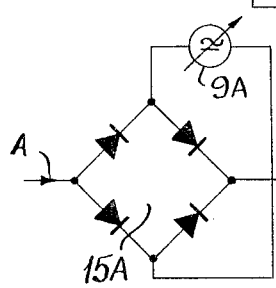
INVENTOR
HORST ZIEGLER
BY
Samuel W. Kipnis
Atty.

United States Patent Office 3,293,911
Patented Dec. 27, 1966

3,293,911
CURRENT-VARIATION TRANSDUCER FOR MEASUREMENT OF FORCE AND THE LIKE
Horst Ziegler, Berlin, Germany, assignor to Continental Elektroindustrie A.G. Askania-Werke, Berlin-Mariendorf, Germany, a corporation of Germany
Filed June 30, 1964, Ser. No. 379,176
Claims priority, application Germany, July 2, 1963, C 30,343
13 Claims. (Cl. 73—141)

This invention relates to a novel and improved transducer for converting a force into an electrical current.

In particular, the invention provides a new force to current transducer of the known self-balancing type in which the input force to be converted is compensated by a compensating or feedback force generated electrically in a feedback channel of the device. A specific construction of the invention relates to transducers of the type converting the input force into an output current which varies as a square root function of the input force.

It is known to use transducers of the last named type in connection with suitable differential pressure measuring means as a fluid flow meter for measuring the flow of a fluid passing through an orifice in a pipe line. The differential pressure created by the orifice is converted into a mechanical force by means of a diaphragm or the like and this force is converted by the transducer into a current which varies as a square root function of the force.

Devices of this and similar type heretofore used have the disadvantage that their proper operation, particularly in the region of forces near zero, is disturbed by forces internal to the device itself, such as the frictional forces within the bearings of the movable parts of the transducer mechanism, and forces from other internal sources.

In practice it is unavoidable that in the zero input force region of the operation range of the transducer the undesired forces become comparable in magnitude with the force to be converted. Therefore, for instance, fluid flow meters using transducers of the above mentioned root extracting type generally measure a certain flow of fluid in cases where no flow exists and transducers of the general type mentioned above generate an output current in cases where the input force is zero.

It is therefore an object of the invention to improve transducers of the self-balancing type for converting an input force into an output current by obviating the above problem and to provide a new transducer of this type which is characterised by having a suppressed force response interval between zero input force and a value of input force which, although relatively small, is sufficiently large so as to be outside the range of the significant error effects caused by the internal sources of error aforementioned.

Another object of the invention is to provide a transducer of the self-balancing type for converting a mechanical force into an electric current having means to prevent or inhibit the normal balancing operation of the device in the suppressed region of response wherein the input force has a magnitude near zero.

A further object of the invention is to provide a transducer of said type in which the normal operation of the transducer will be stopped by means of a force generator working in a feedback path of the transducer.

A more specific object of the invention is to provide a force-to-current tranducer of the self-balancing type having a movable control member receiving the input force and a feedback force for providing a balanced condition in which a force generating means acting upon said control member in the zero force region of the range of operation of the transducer and being adapted to disturb the balanced condition of the forces, is controlled by the output current of the transducer in a manner to give a defined force response at a threshold when the output current reaches a preselected magnitude.

Another object of the invention is to provide an improved transducer of the self-balancing type for converting a force to a current having means to suppress the zero input force region by means of an electrical network connected to the output terminals of a feedback current generator and containing electrical switching means having no movable contacts, an auxiliary current generator and a force generating means acting upon the control member of the transducer to inhibit the normal operation of the transducer, the switching means being controlled by currents independent of the resistances in the electrical network.

Another object of the invention is to provide means for the adjustment of the threshold below which the normal operation of the transducer will be inhibited.

Another object of the invention is to provide an improved electrical network associated with the output and feedback parts of a transducer for converting an input force into an output current having a movable control member adapted to have the input force applied thereto and having in a feedback path of the trandsucer a force generating means fed with a current governed by a device which is controlled by the position of the control member, said force generating means generating a force which is applied to the control member in opposition to the input force and rectifiers for providing suitable currents paths such that a current from a current source inhibits the normal operation of the transducer and suppresses the zero input force region in its range of operation.

Other features of the invention are pointed out in the accompanying claims, drawing and description. Preferred embodiments of the invention are shown in the drawing in which:

FIGURE 1 shows in schematic form a transducer for conversion of a force F into an electrical direct current which varies as a square root function of force F.

FIGURE 2 shows a graph for the explanation of the function of the device according to FIGURE 1.

FIGURE 3 shows a modification of the device shown in FIGURE 1.

FIGURE 4 shows another detail of devices according to the invention.

As shown in FIGURE 1, a control member 1 is illustrated as balanced about a pivot or fulcrum 2. An input force to be measured, designated at F, acts on one of the lever arms of the control member 1, and may be, for example, a force proportional to the differential pressure in a gas pipe line constriction, transmitted by a suitable level mechanism [not illustrated]. As is well known, the square root of the force so produced is proportional to the amount of gas flowing through such a pipeline.

The control member 1 operates a suitable displacement converter or position detecting device 3, producing an electrical indication of the lever position. For example, the position detecting device 3 may be an inductive transmitter producing an alternating voltage of an amplitude varying linearly with the position of the control member 1. The position detecting device 3 may be so designed that the phase of the alternating voltage is reversed on opposite sides of the zero position, in which there is no output voltage.

The phase of the alternating voltage produced by converter 3, which appears on one side of the zero position of the control member 1, is suppressed by suitable means [not shown]. As a consequence, no voltage will be delivered by converter 3 on this side of the zero position.

On the other side of the zero position the converter 3 generates an alternating voltage varying linearly in amplitude with the position of control member 1.

This alternating voltage is fed through line 4 to the input of an amplifier 5, which produces at its output a direct current $i_y$ which varies linearly with the control voltage amplitude. The control member 1 is adjusted [as later described] to assume its zero position with no applied input force.

An electromagnet 6 is employed to exert balancing or feedback force on control member 1. The electromagnet assembly 6 has stationary windings 7 and a moving coil winding 8 in the air gap of the core upon which the stationary winding 7 is wound, the winding 7 and the moving coil 8 being connected in series and being oriented to produce a compensating force F' opposing the force F.

A direct current source 9 [preferably a constant-current source of adjustably fixed output current and high internal resistance] produces a current $i_0$. The electromagnet 6, the output current source 5, and the auxiliary current source 9 are connected in series by means of lines 10, 11, 11A and 12, and the circuit is closed by a connection 13. The lines 11 and 11A interconnect terminals of opposite polarity of the sources 5 and 9, forming a common or junction point A. This junction point is connected to a point B, which is effectively [omitting certain auxiliaries to be described] at the point of connection of the source 5 to the electromagnet 6, through an unidirectional current path provided by diode 14. This unidirectional current path is of polarity opposed to that of the terminals of the source 5 to which it is connected, i.e., so as to be non-conducting to current supplied by source 5.

A second unidirectional current path, provided by diode 15, is shunted directly across the source 9, again in the polarity to be non-conducting to current solely from source 9. A measuring or recording instrument 16 in line 10 indicates the current from source 5, and there is illustrated at 17 a schematic indication of the regulator or controller, etc., which may be employed with the illustrated device.

The operation of this device is as follows:

First we assume that source 9 produces no current [$i_0 = 0$ ma.], the input force F is zero, and that the control member 1 is adjusted by way of a zero spring [not shown] to its zero position. Therefore the output current $i_y$ of amplifier 5 is also zero [$i_y = 0$ ma.] A growing input force F alters the position of the control member 1, it leaves its zero position, and an alternating voltage is fed via line 4 to amplifier 5. The resulting current $i_y$ of amplifier 5 flows over rectifier 15, line 13 through the coils 7 and 8 and over line 10 back to amplifier 5. The magnetic force F' generated by electromagnet 6 is proportional to the square of the current $i_y$ flowing through the coils of the magnet and in the case of equilibrium of the moments produced by both forces, i.e., F and F', the current $i_y$ is proportional to the square root extracted from the input force F. The magnitude of the feedback force F' is governed solely by the output current of amplifier 5 and normal operation of the transducer is obtained.

We now assume that source 9 generates a direct current $i_0$, and further we assume that current $i_0$ is smaller than current $i_y[i_0 < i_y]$. The current $i_y$ flows under these conditions via lead 11 to point A. At point A the current $i_y$ is divided into the current $i_0$ flowing over generator 9 and a current $i_{15} = i_y - i_0$ flowing over rectifier 15. Over line 13 therefore flows the current $i_y$ again and normal operation of the transducer is obtained. The potential across the current source 5 maintains rectifier 14 in a substantially non-conductive condition.

If now the current $i_y$ becomes equal to current $i_0$ or smaller than current $i_0$ the rectifier 15 is reversed biased or blocked by the potential across the current source, and current $i_y$ flows over point A, source 9, lines 12 and 13, and the magnet 6 back to amplifier 5.

The current $i_0$ flows over line 13, magnet 6 and partly over amplifier 5 and partly over rectifier 14, which is now forward biased or conductive, back to the direct current source 9. Over rectifier 14 flows the differential current $i_{14} = i_0 - i_y$. If we now assume that the input force F [and with this force the current $i_y$] falls in a manner that the current $i_y$ becomes equal to current $i_0$ or smaller than this current, the magnet 6 will be fed by the current $i_0$ which is constant. Since the parallel circuit combination of current source 5 and rectifier 14 is in series relation with the parallel circuit combination of current source 9 and rectifier 15 and since the source 9 is essentially a constant current source, for values of the current $i_y$ less than $i_0$, the magnitude of the current on line 13 and thus, the magnitude of the current flowing through magnet 6, is equal to the current $i_0$ which, in turn, must equal the sum of the currents $i_y$ and $i_{14}$. On the threshold $i_y = i_0$ the operation of the transducer becomes unstable because the falling input force F becomes smaller than the feedback force F' and the equilibrium of forces existing on control member 1 is disturbed. The control member 1 pivots therefore towards its zero position and comes to rest on a stop [not shown]. As a consequence, the current $i_y$ becomes zero and the meter 16 measures no input force. The threshold current $i_0$ is adjustable by adjustment of the surrent source 9.

FIGURE 2 shows the feedback force F' generated by magnet 6 as a function of the current $i_y$. In the region $i_y \geq i_0$ the force F' varies as the square of $i_y$. In the region $0 \leq i_y \leq i_0$ the force F' is constant. The region $0 \leq i_y \leq i_0$ may be made as narrow or as wide as is useful or desired in order to obviate the erroneous readings that would otherwise be obtained due to the internal sources of errors aforementioned in this region of input force response.

FIGURE 3 shows a modified form of the device of FIGURE 1, with corresponding reference numerals employed for corresponding parts.

Here, the electromagnet 6 is connected directly to the source 5 so that it produces a force which is under all conditions proportional to the square of the output current from the source.

A separate winding 30 which cooperates with an auxiliary permanent magnet 31, is connected in series with diode 14 and produces a force F'', varying with the current through the diode 14. As in the previous case, the current from junction point A flows through the unidirectional current path formed by diode 14 when the current from source 5 is less than that of source 9, and through the diode 15 when this condition is reversed. Below the threshold, the operation is exactly the same as previously described, except for the fact that increases and decreases of the current contributions of the respective sources are fed to different electromagnet structures, rather than to the same electromagnet structure as in the previous case.

In the modification of FIGURE 3 the permanent magnet system 30, 31 with its coil 30 lying in the air gap of a permanent magnet 31 generates a force F'' proportional to the current $i_{14}$ and the overall moment produced by system 30, 31 and magnet 6 is proportional to the sum of $\alpha F'' + \beta F'$ where $\alpha$ and $\beta$ are constant numbers.

In the case when current $i_y$ becomes equal to current $i_0$, the current $i_{14} = i_0 - i_y$ begins to flow and the feedback force now produced by the two magnetic systems 30, 31 and 6 becomes larger than the input force causing the instability of the transducer and the discontinuance of normal operation in the same manner as explained above.

The output or feedback current source 5 and/or the auxiliary current source 9 which are described herein as direct current sources may be replaced by suitable alternating current sources. FIGURE 4 shows such a replacement of source 9 in FIGURE 3. The source 9A is now an alternating current generator generating, for instance, a 60 c./s.—current and the rectifier 15 of FIGURE 3 is replaced by a rectifier bridge 15A giving full-wave rectification. The direct current is produced across the bridge 15A at points A and B, the bridge functioning to provide the direct current supply as well as the shunt current path for the current of source 5 when that current ($i_y$) exceeds the direct current generated by the source 9A and the bridge rectifier. In other respects the operation of such arrangements is the same as described above.

It may be shown that in essence the desired object is accomplished by a series connection of feedback force generating means, a current source generating the output current and a current source generating the auxiliary current and by means of a direct current gating device connected in parallel with each of the current sources.

It will, of course, be understood that many modifications may be made in employing the teachings of the invention. Although the embodiments illustrated are particularly advantageous, the invention may be employed in modified forms for the same general purposes. Further, it will be seen that the current-supplying portion, considered either as a three-terminal device as in FIGURE 3, or as a two-terminal device as in FIGURE 1, may be employed in other applications; it will be seen that although in the present system, described above, the auxiliary source produces constant current, once it is set, actually the operation is such that the total current is always equal to the greater of the two currents produced by the individual sources even if both are being varied. Further utilizations and modifications of the invention will also be obvious to those skilled in the art.

What is claimed is:

1. In a transducer for producing an electrical current varying with an applied mechanical force, of the type having a member urged in one direction by the applied force, means responsive to displacement of the member by the applied force to produce a current of corresponding magnitude, and means responsive to the magnitude of the current to produce a restoring force urging the member in the direction to restore its position, so that the equilibrium current corresponds to the applied force, the improved construction comprising a first source of direct current of predetermined constant magnitude, a second source of direct current of magnitude varying with the displacement, each of said sources and said restoring force means having terminals, a direct connection between oppositely polarized terminals of the respective sources to form a junction point supplied with net current of magnitude and polarity constituting the difference of the outputs of the sources, a unidirectional current-flow path shunting the first source but of polarity opposed to the polarity of current from the first source, a unidirectional current flow path of the polarity of current from the first source connecting the junction point to a terminal of the restoring-force means, the opposite terminal of the latter being connected directly to the opposite terminal of the first source, and means for connecting the opposite terminal of the second source to the restoring-force means, so that as the current from the second source is increased from zero, the current fed to the restoring-force means is constant until the current from the second source reaches a threshold value beyond which it increases the restoring force.

2. In a device for producing an electric current varying with an applied mechanical force, of the type having a movable member urged in one direction by the applied force, a current-varied restoring force means urging the member in the opposite direction, and means responsive to deviation of said member in said one direciton from a reference position to supply current to the restoring force means to counteract the applied force, so that the equilibrium current is indicative of the applied force, the improved construction having the current-supplying means comprising a first source of direct current responsive in magnitude only to said deviation, and a second source of direct current of a constant predetermined magnitude independent of said deviation, a pair of terminals of opposite polarity of the respective sources being joined to form a common junction point supplied with a net current of magnitude and polarity corresponding to the difference of the currents supplied by the respective sources, first unidirectional current flow means shunting the second source and being of polarity to block the current therefrom, and second unidirectional current flow means connecting the junction point to the restoring force means and being of polarity opposite the first as regards flow of current from the junction point and means for connecting the other respective terminals of the sources to the restoring force means, the current to the restoring-force means remaining equal to the output of the second source for increasing values of current output of the first source up to equality with the output of the second source, but thereafter being equal to the output of the first source.

3. The device of claim 2 wherein said second unidirectional current flow means and said other terminal of the first source are connected to feed the same portion of the force-restoring means, said portion constituting an electromagnet producing force proportional to the square of the current.

4. The device of claim 2 wherein said second unidirectional current flow means and said other terminal of the first source are connected to feed different portions of the force-restoring means, one portion constituting an electromagnet producing force proportional to the square of the current flowing therethrough and the other constituting an electromagnet producing a force proportional to the current flowing therethrough.

5. A transducer of the self-balancing type for converting a force into an electrical output current having a movable control member responsive to the action of the force; a position detecting device converting the displacement of said member into a signal which in turn controls the output delivered by a current generator; current-responsive force generating means adapted to respond to said controlled-output current generator to apply a feedback force to the control member in opposition to the input force; an electrical circuit containing a second current generator to generate a constant auxiliary current; said current-responsive force generating means adapted to respond to the second current generator to generate a force to be applied to the control member in the same direction as the feedback force; and switching means responsive to the relative magnitudes of the currents of the generators to couple only the larger of the currents to the force-generating means, whereby the opposing force has a minimum value above which it is responsive to the control member.

6. A transducer of the self-balancing type for converting a force into a current having a movable control member adapted to receive the input force, a position detecting device connected to said member and producing a signal variable with the position of the member; a first current source in parallel with first direct current gate means, the current produced by said first source being controlled by the signal generated by said position detecting device and producing a direct current potential across said first gate means; an adjustable auxiliary current source with second direct current gate means in parallel and producing across said second gate means a direct current potential of value; a feedback force generating means acting upon said control member and adapted to generate a force opposing the input force and being variable with the signal of said position detecting device; the feedback force generating means and the gating means being connected in series, and a connection closing the path containing gating means and feedback force generator.

7. A force to current transducer of the self-balancing type having a movable control member adapted to receive the action of the force to be converted, a position detecting device producing an electrical signal variable with the position of the control member; a first current generator having its current variable in accordance with said electrical signal, first rectifying means in parallel with said first current generator, and said first current generator generating a direct current potential across said rectifying means; a second current generator having its current adjustable to a fixed value, second rectifying means in parallel with said second current generator, and said second current generator generating a direct current potential across said second rectifying means; an electromagnet acting upon said control member and generating a force proportional to the square of a current fed to its winding, the first and second current sources with said rectifying means in parallel being connected in series with said winding.

8. A transducer for converting an input force to an output current having a movable control member adapted to receive the action of the input force; a position detecting device generating a signal variable with the position of said control member; a variable output current generator controlled by said signal and feedback force generating means which applies its force to said member in opposition to said input force; a second current generator delivering a current of a fixed value; and means controlled by the difference between the currents of said generators for keeping the feedback force exerted on said control member entirely constant when the current of said variable output current generator falls below a threshold fixed by the current of said second current generator.

9. A transducer of the self-balancing type for converting a force into a current comprising a movable control member adapted to receive an input force, position-detecting means connected to the control member for producing a signal varying with deviation of the control member from a reference position, current-responsive means having at least one pair of input terminals for applying to the control member a force opposing the input force, a variable current source controlled by the variable signal, a fixed current source, and means responsive to the relative current outputs of the sources to energize the opposing force means by the current from the variable source when it exceeds a threshold value and by the current from the fixed source when the variable source is below the threshold value.

10. The transducer of claim 9 wherein the last-said means comprises a plurality of rectifiers including a first rectifier directly bridged across the fixed source in the polarity direction opposed to flow of current therefrom, the first rectifier being in circuit connection at one terminal thereof with one of a pair of input terminals of the current-responsive opposing force means, the other terminal of said first rectifier and the other input terminal of said pair being bridged across the variable current source in the polarity direction to conduct the current therefrom, a second rectifier having one terminal in circuit connection to one of a pair of input terminals of the opposing force means, the other terminal of said second rectifier and the other input terminal of the last-said pair being bridged across the fixed source in the polarity direction to conduct the current therefrom, so that the current to the force means is equal to the current of the variable source at values thereof higher than a minimum current provided by the fixed source, but is otherwise the constant minimum.

11. The transducer of claim 10 wherein the opposing force means has only one pair of terminals, common to both said rectifier circuits.

12. The transducer of claim 10 wherein the opposing force means has two pairs of terminals, one terminal of the pairs being connected together and said connection being common to both said rectifier circuits.

13. The transducer of claim 9 wherein the means responsive to the relative current outputs comprises rectifiers connected across at least one of the current generators and being of polarity to provide a shunt path across the generator only when the current from the other generator is greater.

References Cited by the Examiner
UNITED STATES PATENTS

| 2,669,874 | 2/1954 | Ziegler | 73—206 |
| 2,949,775 | 8/1960 | Newbold | 73—205 |
| 3,079,792 | 3/1963 | Hubbs | 73—141 |

RICHARD C. QUEISSER, *Primary Examiner.*

CHARLES A. RUEHL, *Assistant Examiner.*